(12) United States Patent
Lee et al.

(10) Patent No.: US 9,398,337 B2
(45) Date of Patent: Jul. 19, 2016

(54) METHOD AND APPARATUS FOR ASSIGNING VIDEO BITRATE IN MOBILE COMMUNICATION SYSTEM

(71) Applicants: Samsung Electronics Co., Ltd., Gyeonggi-do (KR); SNU R&DB Foundation, Seoul (KR)

(72) Inventors: Hyungho Lee, Seoul (KR); Taekyoung Kwon, Seoul (KR); Jicheol Lee, Gyeonggi-do (KR); Youngbin Im, Seoul (KR); Hanna Lim, Seoul (KR); Taejoong Chung, Seoul (KR); Dookyoon Han, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/301,283

(22) Filed: Jun. 10, 2014

(65) Prior Publication Data

US 2014/0366070 A1    Dec. 11, 2014

(30) Foreign Application Priority Data

Jun. 10, 2013  (KR) .......................... 10-2013-0065634

(51) Int. Cl.
| | | |
|---|---|---|
| H04N 21/2662 | (2011.01) | |
| H04N 21/6373 | (2011.01) | |
| H04N 21/462 | (2011.01) | |
| H04N 21/647 | (2011.01) | |
| H04N 21/414 | (2011.01) | |
| H04N 21/61 | (2011.01) | |
| H04N 21/24 | (2011.01) | |

(52) U.S. Cl.
CPC ....... H04N 21/4621 (2013.01); H04N 21/2402 (2013.01); H04N 21/2662 (2013.01); H04N 21/41407 (2013.01); H04N 21/6131 (2013.01); H04N 21/6373 (2013.01); H04N 21/64769 (2013.01)

(58) Field of Classification Search
CPC .................................................. H04N 21/4621
USPC ........................................................... 725/62
See application file for complete search history.

(56) References Cited

U.S. PATENT DOCUMENTS

| 8,327,405 B2* | 12/2012 | Cilli et al. ....................... 725/62 |
| 8,694,631 B2* | 4/2014 | Lohmar et al. ................ 709/224 |
| 8,914,535 B2* | 12/2014 | Ashrafi ........................ 709/231 |
| 9,032,427 B2* | 5/2015 | Gallant et al. ..................... 725/9 |
| 2011/0070820 A1* | 3/2011 | Gao et al. ..................... 455/3.06 |
| 2012/0311651 A1* | 12/2012 | Kahn et al. ..................... 725/116 |
| 2013/0227106 A1* | 8/2013 | Grinshpun et al. ........... 709/223 |

(Continued)

*Primary Examiner* — Nathan Flynn
*Assistant Examiner* — Caroline Somera

(57) ABSTRACT

An embodiment provides a method for supporting video transmission and reception in a bitrate selection server of a mobile communication system. The method includes receiving a metadata request of a video from a terminal. The method also includes transmitting the received metadata request to a media server based on the request; receiving a metadata response from the media server. The method also includes storing the received video metadata and transmitting the received video metadata to the terminal. The method also includes requesting subscriber information of the terminal to a Policy and Changing Rules Function (PCRF) and receiving the subscriber information. The method also includes receiving a video segment request of the video from the terminal. The method also includes determining a bitrate of the video based on at least one of the video metadata and the subscriber information.

6 Claims, 8 Drawing Sheets

(56) References Cited

U.S. PATENT DOCUMENTS

| | | | |
|---|---|---|---|
| 2013/0294403 A1* | 11/2013 | Srinivasan | 370/331 |
| 2013/0298170 A1* | 11/2013 | Elarabawy | H04W 28/0231 725/62 |
| 2014/0025830 A1* | 1/2014 | Grinshpun et al. | 709/227 |
| 2014/0031006 A1* | 1/2014 | Moore et al. | 455/405 |
| 2014/0040498 A1* | 2/2014 | Oyman et al. | 709/231 |
| 2014/0161050 A1* | 6/2014 | Grinshpun et al. | 370/329 |
| 2014/0233413 A1* | 8/2014 | Dahod et al. | 370/252 |
| 2014/0269269 A1* | 9/2014 | Kovvali et al. | 370/229 |
| 2014/0314080 A1* | 10/2014 | Park et al. | 370/391 |
| 2014/0317308 A1* | 10/2014 | Zhang et al. | 709/231 |

\* cited by examiner

FIG. 7
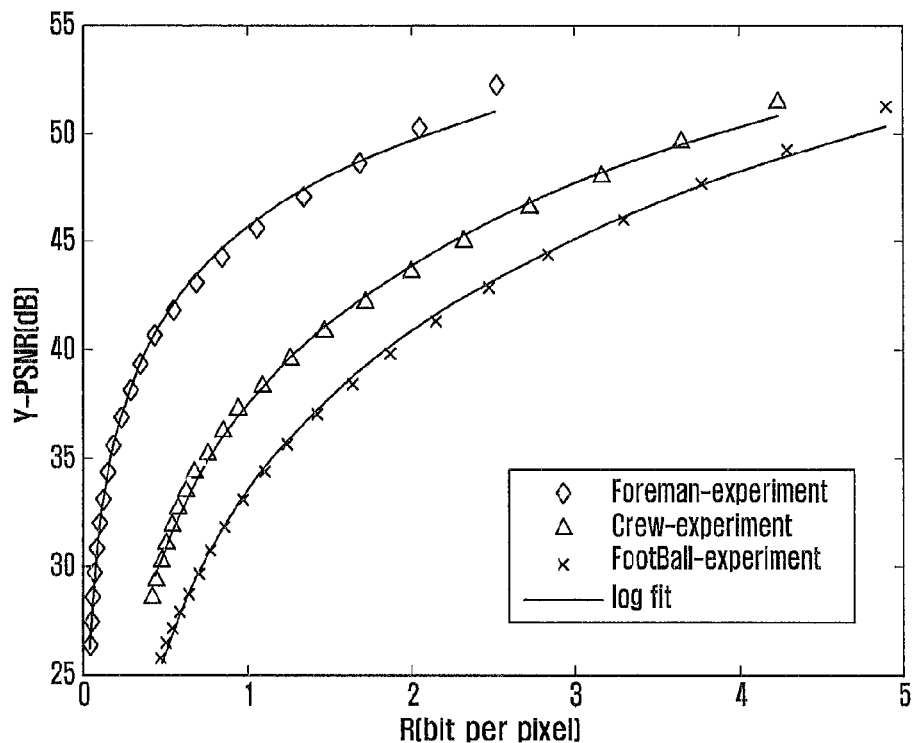
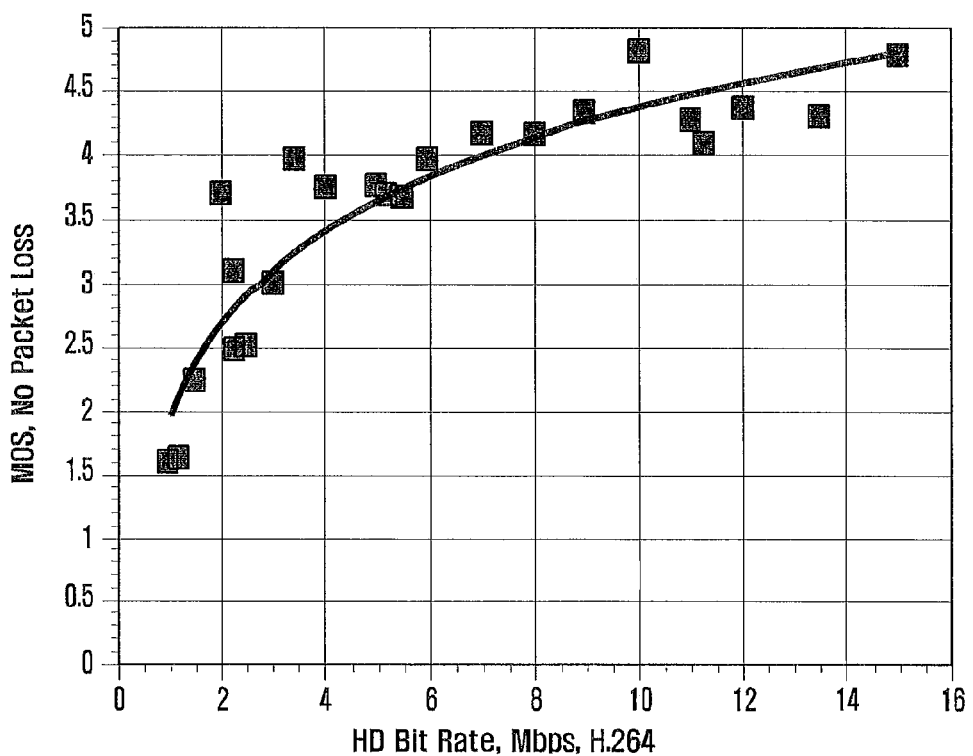

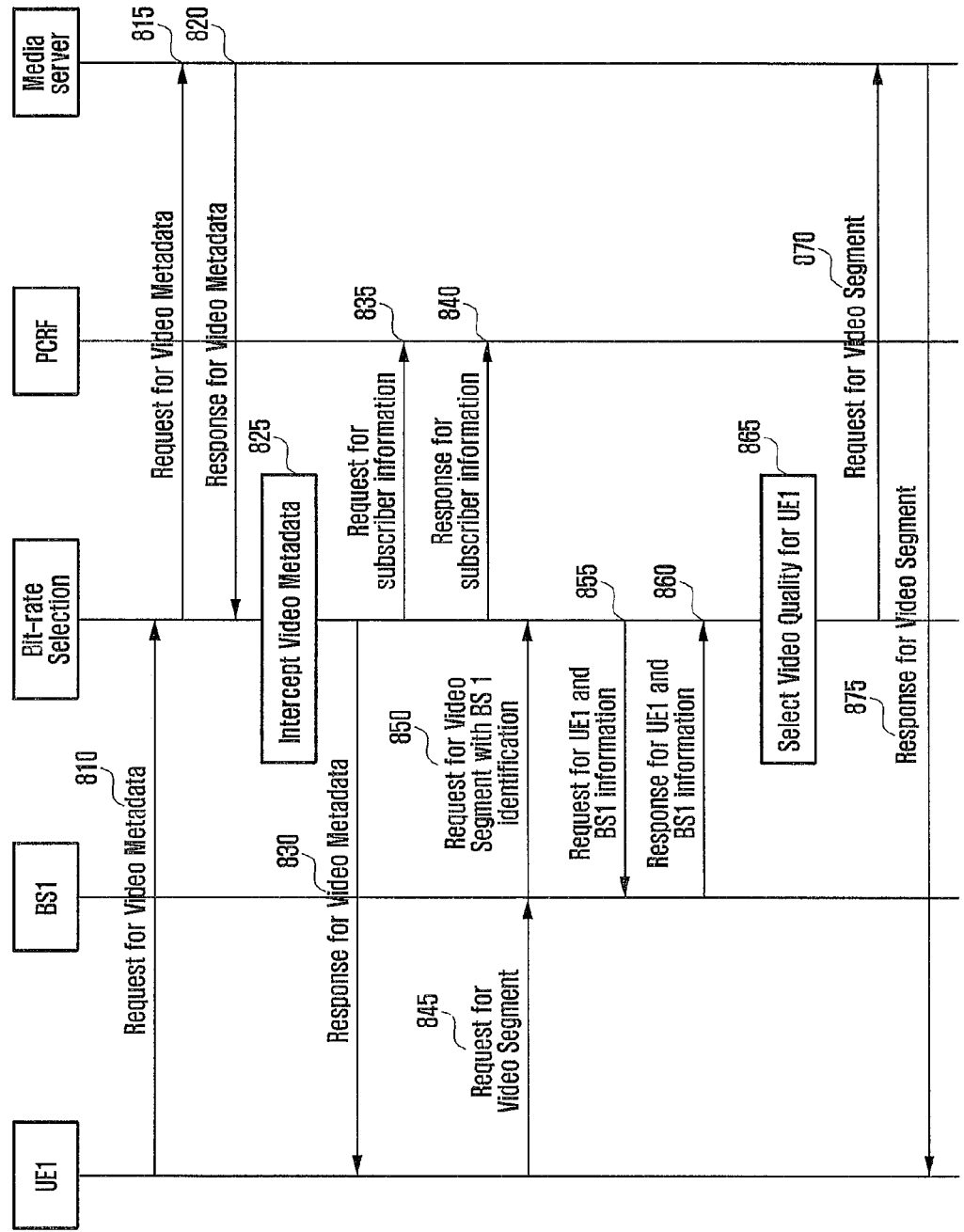

METHOD AND APPARATUS FOR ASSIGNING VIDEO BITRATE IN MOBILE COMMUNICATION SYSTEM

CROSS-REFERENCE TO RELATED APPLICATION(S) AND CLAIM OF PRIORITY

The present application is related to and claims priority from and the benefit under 35 U.S.C. §119(a) of Korean Patent Application No. 10-2013-0065634, filed on Jun. 10, 2013, which is hereby incorporated by reference for all purposes as if fully set forth herein.

TECHNICAL FIELD

The present disclosure relates generally to a method and an apparatus for assigning a video bitrate in a mobile communication system, and more particularly, to a method and an apparatus for assigning a video bitrate for extending a bandwidth and a channel state used in a terminal and improving a user's convenience in the whole cell.

BACKGROUND

In a mobile environment, video traffic makes up about 70% of the whole traffic, and an amount of the whole traffic consistently increases. Thus, a method for effectively transmitting a video in the mobile environment is necessary, and a Quality of Service (QoS) of the whole users in a cell not only a specific user should be generally considered. In order to effectively transmit the video traffic, various Hypertext Transfer Protocol (HTTP) adaptive streaming methods are developed. Among the HTTP adaptive streaming methods, there is an HTTP live streaming method of Apple, a smooth streaming method of MS, and so on. In addition, there is a 3rd Generation Partnership Project Dynamic Adaptive Streaming over HTTP (3GPP DASH) generated by standardizing these methods. In addition, a Scalable Video Coding (SVC) encodes a video to a high-definition of a bit stream including at least one bit stream, as an extension of an H.264/MPEG-4 Advanced Video Coding (AVC) video compression standard. A low rank video bit stream may be generated by throwing away some packets from the whole video file. In addition, there are spatial modes capable of providing expandability through a change of a video screen size, a temporal mode capable of providing expandability through a change of a frame rate, a quality mode capable of providing expandability through a change of a video quality, and the like. In addition, an HTTP Progressive DownLoad (PDL) video technology is a technology for starting a playing of a video file when an amount of video data capable of being played is received by a terminal, after the whole video file is downloaded in response to one request like a general file download. Therefore, when a download speed is faster than a playing speed, a loss of a wireless bandwidth is generated. Also, when the download speed is slower than the playing speed, a playing delay phenomenon is generated. Thus, in an example of an Over-The-Top (OTT) using this method, it is necessary to optimize the video file downloaded in a communication provider network, and this technology is referred to as a Mobile Video Optimization (MVO). The MVO includes detailed technologies such as a video parsing, an online translating/transcoding, dynamic bitrate adaptation, and the like.

However, in an example of an HAS, a client controls the bitrate of the video by using only information (a Media Presentation Description (MPD) and a Transmission Control Protocol (TCP) throughput and so on) known to the client, and thus the client may not generally consider the QoS of several users in the cell of the mobile communication network environment. For example, when several users watch the video, each of the clients selects the bitrate separately. Therefore, when one user selects a comparatively higher bitrate, another user should select a comparatively lower bitrate. Thus, fairness among the users may not be considered. In addition, in the example of the SVC, it is not defined how to utilize a standard for a scalable video according to a network condition. Thus, a proper application of the SVC in various network conditions is needed. The MVO performs functions of a parsing, a translating, a transcoding, a bitrate adaptation and so on separately with respect to each of User Equipments (UEs). Thus, more resources for a calculation and a storing may be consumed, in comparison with a method for encoding once and recycling this. In addition, similarly to the HAS, in the selection of the bitrate, it is operated based on a changeable TCP bandwidth of each of the UEs, and thus the QoS may be not provided in balance to several users in the cell.

SUMMARY

To address the above-discussed deficiencies, it is a primary object to provide a method and an apparatus for assigning a bitrate of a video capable of maximizing a utility of the whole users in a cell in a mobile communication system. In addition, the present disclosure provides a method and an apparatus for assigning a bitrate capable of maximizing a utility of a user by utilizing Media Presentation Description (MPD) information, resource assignment information of a base station, device information, user's concentration information and user's video quality preference information.

In accordance with an aspect of the present disclosure, a method provides for supporting video transmission and reception in a bitrate selection server of a mobile communication system. The method includes receiving a metadata request of a video from a terminal. The method also includes transmitting the received metadata request to a media server based on the request; receiving a metadata response from the media server. The method also includes storing the received video metadata and transmitting the received video metadata to the terminal; requesting subscriber information of the terminal to a Policy and Changing Rules Function (PCRF) and receiving the subscriber information. The method also includes receiving a video segment request of the video from the terminal. The method also includes determining a bitrate of the video based on at least one of the video metadata and the subscriber information.

In accordance with another aspect of the present disclosure, a method provides for receiving a video in a terminal of a mobile communication system. The method includes transmitting a metadata request of the video to a media server. The method also includes receiving a metadata response of the video from the media server. The method also includes transmitting a video segment request of the video to a base station; and receiving the video with a bitrate selected in a bitrate selection server. The bitrate selection server stores a video metadata included in the metadata response, requests subscriber information of the terminal to a Policy and Changing Rules Function (PCRF), receives the subscriber information, and determines the bitrate of the video based on at least one of the video metadata and the subscriber information.

In accordance with another aspect of the present disclosure, a bitrate selection server provides for supporting transmission and reception of a video in a mobile communication system. The bitrate selection server includes a transmission and reception unit that transmits and receives a signal to or from another communication entity. The bitrate selection server also includes a control unit that controls the transmission and reception unit, receives a metadata request of a video from a terminal, transmits the received metadata request to a media server based on the request, receives a metadata response from the media server, stores the received video metadata, transmits the metadata to the terminal, requests a subscriber information of the terminal to a Policy and Changing Rules Function (PCRF), receives the subscriber information, receives video segment request of the video from the terminal, and determines a bitrate of the video based on at least one of the video metadata and the subscriber information.

In accordance with another aspect of the present disclosure, a terminal provides for transmitting and receiving a video in a mobile communication system. The terminal includes a transmission and reception unit that transmits and receives a signal to or from another communication entity. The terminal also includes a control unit that controls the transmission and reception unit, transmits a metadata request of the video to a media server, receives a metadata response of the video from the media server, transmits a video segment request of the video to a base station and receives the video with a bitrate selected in a bitrate selection server. The bitrate selection server stores a video metadata included in the metadata response, requests subscriber information of the terminal to a Policy and Changing Rules Function (PCRF), receives the subscriber information, and determines the bitrate of the video based on at least one of the video metadata and the subscriber information.

According to an embodiment of the present disclosure, a streaming proxy assigns a bitrate or a Scalable Video Coding (SVC) layer in consideration of a capacity of a wireless resource, therefore a load in a wireless link decreases in comparison when each of User Equipments (UEs) independently selects the bitrate or the SVC layer in consideration of only a bandwidth assigned thereto without considering the capacity of the wireless resource. Especially, a communication provider may select an amount of the wireless resource used for a video according to an environment of a network, and thus the wireless resource may be used flexibly and effectively.

In addition, when the streaming proxy assigns the bitrate or the SVC layer, the streaming proxy selects the bitrate or the SVC layer in order to maximize a sum of a satisfaction of all users in a cell, and thus a Quality of Service (QoS) or a Quality of Experience (QoE) of overall users is improved. In addition, the streaming proxy does not assign a video having a quality of higher than necessary in consideration of a resolution of a terminal or a user's concentration, and thus a data cost of the user may decrease.

In addition, a proper bitrate or SVC layer is assigned according to a rate system and a user's class and so on, and thus various video services and rate systems may be provided. In addition, a video encoded once may be recycled, therefore a function of a Mobile Video Optimization (MVO), of which a cost of a storage device decreases and a cost of hardware for encoding decreases, may be implemented, in comparison with an existing MVO performing the encoding with respect to each of the UEs.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates a video quality in accordance with the bitrate assignment according an embodiment; and FIG. 8 illustrates a signal flow for describing the bitrate assignment according to an embodiment.

DETAILED DESCRIPTION

Figure 1:
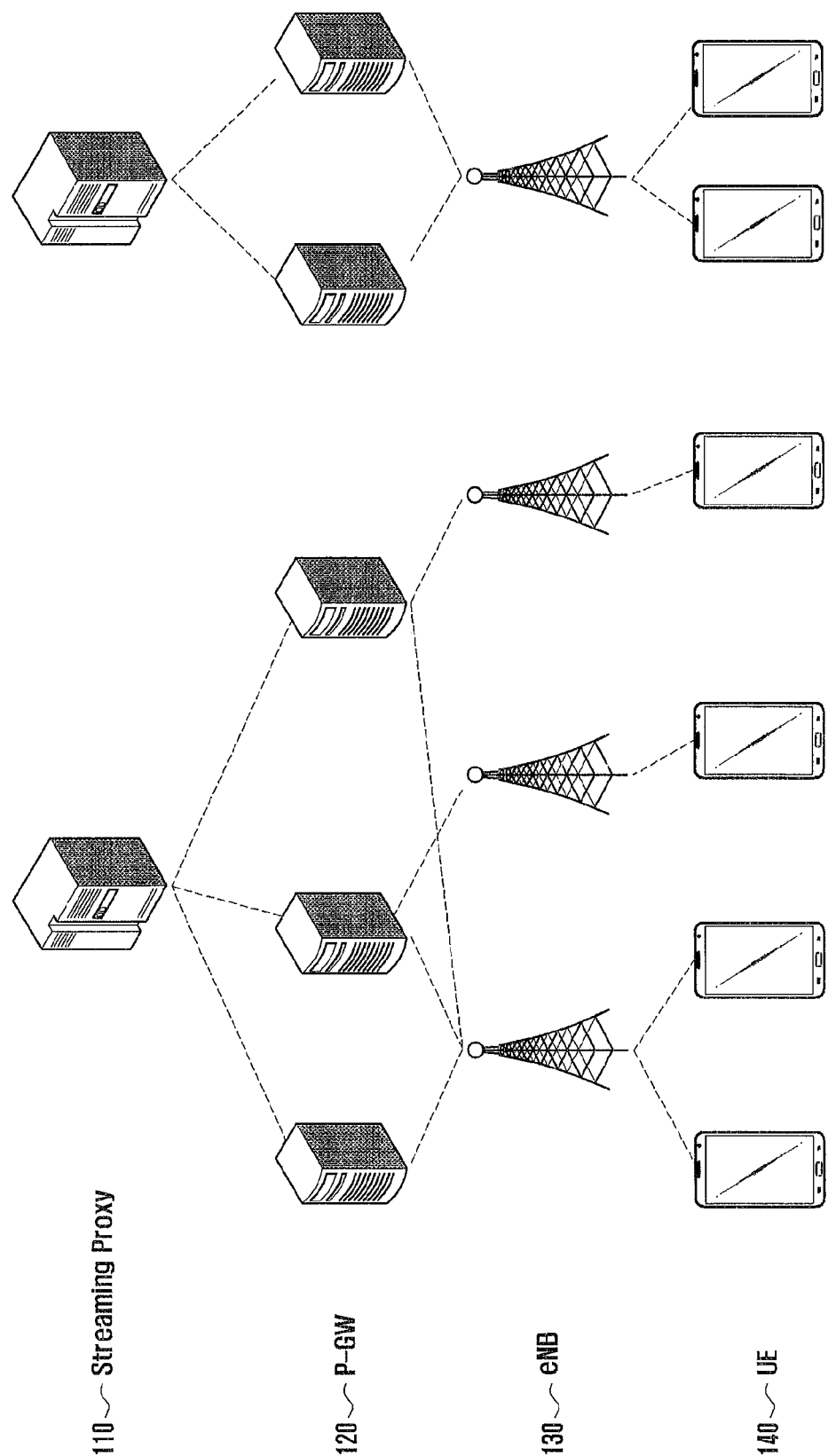
FIG. 1 illustrates a structure of a system according to an embodiment.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method. Hereinafter, embodiments of the present disclosure will be described in detail with reference to the accompanying drawings.

In describing the exemplary embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational operations to be performed on the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

Each of communication entities of the embodiment may include a transmission and reception unit capable of transmitting or receiving a signal to or from another communication entity, and a control unit capable of controlling the transmission and reception unit and capable of controlling operations of each of the communication entities based on data transmitted or received through the transmission and reception unit. In addition, when each of the communication entities is adjacent to each other, the transmission and reception unit may be shared. In addition, each of the entities may further include a storage unit capable of storing transmitted and received data and data processed in the control unit.

In addition, the present disclosure of the embodiment may provide a method and an apparatus for assigning a video (a bitrate or a layer when a Scalable Video Coding (SVC)) capable of maximizing a video using a feeling of the whole terminal in a cell based on wireless resource information assigned to a terminal transmitting or receiving data including a video to or from a base station located in the cell controlled by the base station, wireless environment information (i.e. a transmittable byte per a resource block) of the terminal and a user's satisfaction (i.e. QoE) information (i.e. a user's feeling satisfaction (e.g., a Peak Signal-to-Noise Ratio (PSNR) or a Mean Opinion Score (MOS)) per a segment or a layer) according to a size of a video traffic.

FIG. 1 illustrates a structure of a system according to an embodiment.

According to the embodiment, a mobile communication system may include a streaming proxy server 110 (hereinafter, may be referred to as a streaming proxy), a PDN Gateway (P-GW) 120, a base station (i.e. an evolved Node B (eNB)) 130 and a terminal (i.e. a User Equipment, UE) 140.

According to an embodiment, the streaming proxy server 110 may be connected to the P-GW 120, and may be located with each of the communication entities. The streaming proxy server 110 may include a storage unit capable of storing video related information.

In the embodiment, the streaming proxy server 110 may be located along with the P-GW 120. In addition, when one eNB 130 is connected to several P-GWs 120, one streaming proxy server 110 controlling the several P-GWs 120 may be included in the mobile communication system. That is, the several P-GWs 120 controlling the same eNB 130 may be controlled by the same streaming proxy server 110.

The streaming proxy server 110 according to the embodiment may include at least one of the following functions.

i. A function of inspecting a Hypertext Transfer Protocol (HTTP) request of the terminal 140 through a Deep Packet Inspection (DPI) and sampling a Uniform Resource Locator (URL) of a Media Presentation Description (MPD)

ii. A function of requesting the MPD through the sampled URL of the MPD and parsing the result of the request to store MPD information iii. A function of inspecting the HTTP request of the terminal 140 through the DPI and sampling the URL of the video and device kind information of the terminal 140 iv. A function of determining which P-GW 120 transmits the HTTP request of the terminal 140 and storing the determination v. A function of comparing the sampled URL of the video with the stored MPD information to request the highest quality of file of the corresponding video to a media server vi. A function of dividing a Transmission Control Protocol (TCP) between the terminal 140 and the media server into two or more TCPs such as a TCP between the terminal and the streaming proxy, and a TCP between the streaming proxy and the media server vii. A function of encoding the video received from the media server to a Scalable Video Coding (SVC) of several bitrates or several layers to perform a caching on the encoded SVC viii. A function of requesting video related policy information to the PCRF and receiving the video related policy information from the PCRF The policy includes the following information.
  A. Maximum bitrate or SVC layer of each of the UEs
  B. Preferred bitrate or SVC layer of each of the UEs
  C. Assigning bitrate or SVC layer selection of each of the UEs or not
  D. Subscriber information of each of the UEs ix. A function of periodically requesting the following information to the eNB 130 to receive the following information
  A. A number of a Radio resource Block (RB) assigned to the video of each of the UEs during a unit time
  B. A downlink video transmission byte number of each of the UEs during the unit time x. A function of inspecting the HTTP request of the terminal 140 through the DPI and sampling a user's concentration xi. A function of assigning the bitrate or SVC layer transmitted to each of the terminals 140

The streaming proxy 110 assigns the bitrate or the SVC layer by using the following information.

A. The UE 140 in the cell and the video watched by each of the UEs 140

B. A previously assigned bitrate or SVC layer information of each of the videos watched by the UE 140

C. The resource block assignment and the downlink transmission information of the eNB 130

D. A unit byte size of the bitrate or SVC layer, and a bitrate number or a SVC layer number of each of the videos E. A satisfaction function (i.e. utility function) of the user according to the bitrate or the SVC layer. In the satisfaction function, the higher the bitrate or the SVC layer is, the higher the satisfaction may be, and an increasing height may gradually decrease. A satisfaction value may be determined by a communication provider, or a CP may provide the satisfaction value to each of the bitrates of the MPD. In addition, the function may be controlled in consideration of a quality sensitivity value of the MPD. That is, a utility higher than a utility in an example wherein the quality sensitivity is high is provided, and thus a comparatively higher bitrate or SVC layer may be assigned.

F. A number of the RB during one bitrate assignment interval (defined by the communication provider)

G. A device kind of the terminal 140

H. Information including at least one of the video related policy received from the PCRF and the subscriber information I. The user's concentration information received from the UE 140

In addition, in the embodiment, the PCRF of the communication may store the video related policy. In addition, the PCRF may include a function of responding to the video related policy information request of the streaming proxy. The video related policy may include at least one of the following.
  i. The maximum bitrate or SVC layer of each of the UEs
  ii. The preferred bitrate or SVC layer of each of the UEs
  iii. The assigning bitrate or SVC layer selection of each of the UEs or not In addition, a content of a message exchanged to respond to a message requesting the policy to the PCRF may be as follows. A message format may follow the format described in the embodiment, and may have at least one field value described in the embodiment.

A information request message

| Type = VIDEOPOLICY_INFO_REQUEST | Length (record number) |
|---|---|
| UE Identifier1 (UE identifier, e.g., TMSI) | UE Identifier2 |
| UE Identifier3 | UE Identifier4 |
| ... | ... |

A Response message to the information request

| | | | Length (Record number) |
|---|---|---|---|
| Type = VIDEOPOLICY_INFO_RESPONSE UE Identifier1 (UE identifier, e.g., TMSI) | MaxRate1 (maximum bitrate) | Preferred1 (pefered bitrate) | Delegate1 (assigning bitrate or SVC layer selection or not) |
| UE Identifier2 UE Identifier3 | MaxRate2 MaxRate3 | Preferred 2 Preferred 3 | Delegate2 Delegate3 |
| ... | ... | ... | ... |

In addition, the eNB 130 of the embodiment stores the following information, and may transfer one of the following information in response to the request of the streaming proxy.
  i. The number of the RB assigned to the video of each of the UEs during the unit time
  ii. The downlink video transmission byte number of each of the UEs during the unit time The exchanged message format may follow the format described in the embodiment, and may have at least one field value described in the embodiment.

The information request message

| Type = RB_INFO_REQUEST | TimeStamp (start time) |
|---|---|

The Response message to the information request

| Type = RB_INFO_RESPONSE | TimeStamp (start time) | Duration (effective time) | Length (record number) |
|---|---|---|---|
| UE Identifier1 (UE identifier, e.g., TMSI) | | RbNum1 (assigned RB number) | Bytes1 (transmission byte number) |
| UE Identifier2 UE Identifier3 | | RbNum2 RbNum3 | Bytes2 Bytes3 |
| ... | | ... | ... |

Throughput information of each of the UEs may be transmitted instead two kinds of the information including the number of the RB assigned to the video of each of the UEs and the downlink video transmission byte number of each of the UEs during the unit time are transmitted. In this embodiment, the response message format to the information request is the same as the following.

| Type = RB_INFO_RESPONSE | TimeStamp (start time) | Duration (effective time) | Length (record number) |
|---|---|---|---|
| UE Identifier1 (UE identifier, e.g., TMSI) | | Throughput1 (throughput) | |
| UE Identifier2 | | Throughput2 | |
| UE Identifier3 | | Throughput3 | |
| ... | | ... | ... |

In addition, the terminal 140 of the embodiment may include the following function.

The terminal has a function (i.e. cnn.com/video_s1?attention=0) of transferring the user's concentration information through the URL, and the terminal sends the user's concentration information in addition to the existing video segment URL.

In addition, a Dynamic Adaptive Streaming over HTTP (DASH) MPD may also include the following function. A quality sensitivity field is added to segment information so that the CP displays an image quality sensitivity of the corresponding segment. For example, the image quality sensitivity has a high value in an example of an action scene of movie to which a high quality of image is desirable, and the image quality sensitivity has a low value in an example of a simple dialogue scene.

In addition, the streaming proxy server 110 of the embodiment may include at least one of the following functions.

A function of inspecting the HTTP request of the terminal 140 through the DPI, sampling the URL of the MPD, and a function of requesting the MPD and parsing the result of the request to store the MPD.

A function of sampling the URL of the video by inspecting the HTTP request of the terminal 140 through the DPI, and a function of comparing the sampled URL of the video with the stored MPD information to request the highest quality of file of the corresponding video to the media server.

A function of encoding the video received from the media server to the SVC of the several bitrates or the several layers to perform the caching on the encoded SVC.

A function of assigning the bitrate or the SVC layer of the streaming proxy.

A function of inspecting the HTTP request of the terminal through the DPI and sampling the user's concentration.

In addition, the PCFR may store the video related policy and transfer the stored policy to the streaming proxy server.

In addition, sensitivity according to a change of an image quality may be displayed to segment information of the DASH MPD. In an embodiment, an image kind requiring a high quality of image may be displayed. In addition, information including a predetermined video category may be displayed. The bitrate needed by the video may be controlled based on the displayed information. In addition, the information may include screen configuration information of the image, and a required bitrate number may be controlled according to the screen configuration information.

Figure 2:
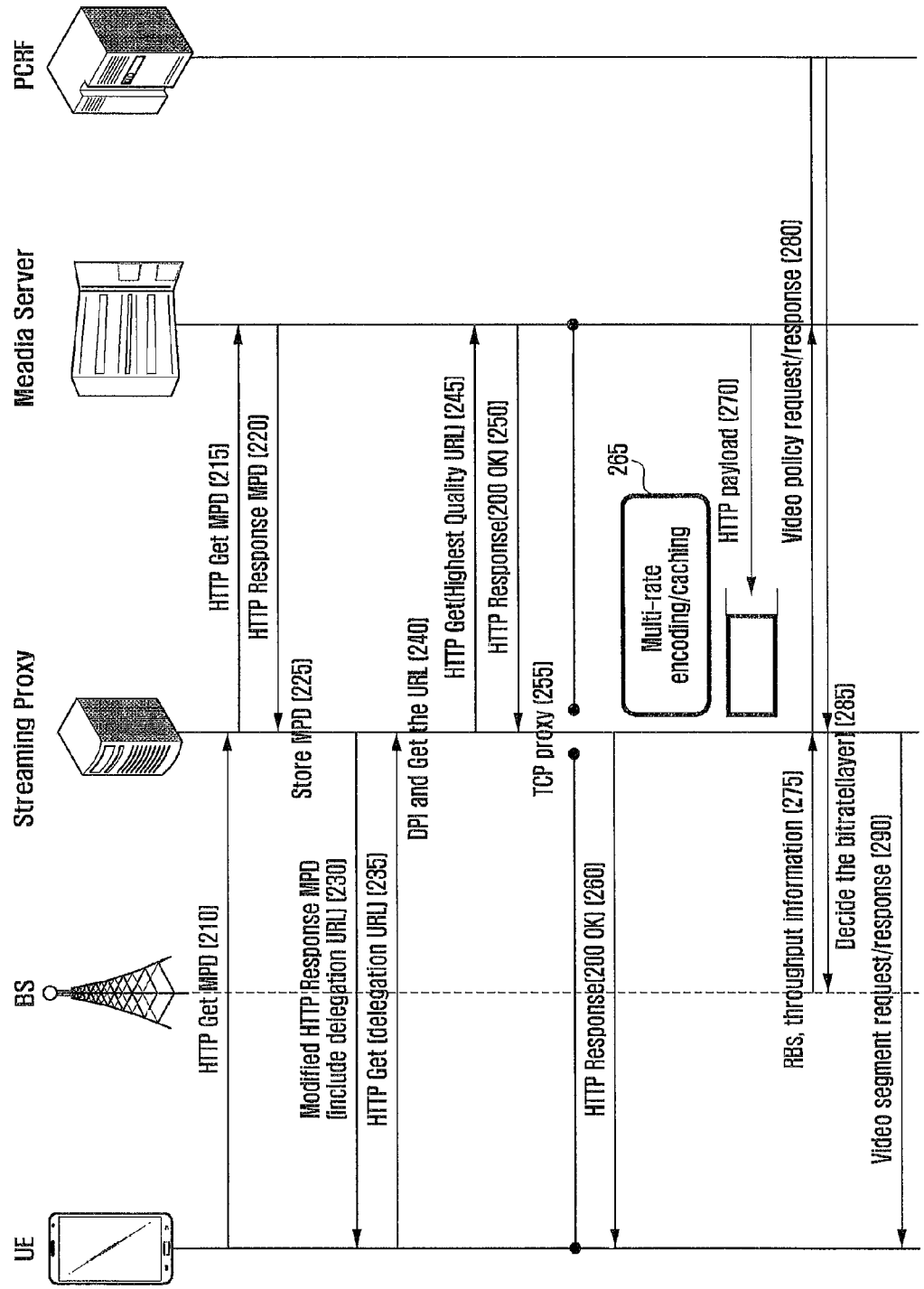
FIG. 2 illustrates signal transmission and reception for assigning a bitrate according to an embodiment.

FIG. 2 illustrates signal transmission and reception for assigning the bitrate according to an embodiment.

Referring to FIG. 2, a communication system of the embodiment includes a terminal (i.e. a User Equipment (UE)) 201, a base station 202, a streaming proxy server (may be referred to as a streaming proxy) 203, a media server 204 and a PCRF 205, a signal may be transmitted or received between each of entities. In the embodiment, the streaming proxy server 203 may be located with the base station 202.

In operation 210, the terminal 201 may transmit the message for transmitting the HTTP request packet for requesting the MPD to the media server 204. In the embodiment, the streaming proxy 203 may divide a TCP connection between the UE and the media server into two TCP connections including a TCP between the UE 201 and the streaming proxy 203, and a TCP between the streaming proxy 203 and the media server 204 (it may be performed the same as operation 255, and a sequence of the division in the embodiment may be changed). In addition, in the embodiment, the streaming proxy 203 may inspect the HTTP request transmitted from the UE 201 through the DPI and may sample the URL of the MPD.

In operation 215, the streaming proxy 203 may request the MPD to the media server 204 with the HTTP based on the message received in operation 210.

In operation 220, the streaming proxy 203 may receive the HTTP MPD response based on the request transmitted in operation 215.

In operation 225, the streaming proxy 203 may parse the information received in operation 220 to store the MPD information.

In operation 230, the streaming proxy 203 adds the URL enabling the terminal 201 to transmit the request for assigning the bitrate or the SVC layer selection to the streaming proxy 203 to the MPD received from the media server 204, and this is transferred to the UE 201.

In operation 235, the UE 201 receives the MPD, parses the MPD and sends the HTTP request packet for requesting the video segment to the media server. In the embodiment, it may be assumed that the terminal 201 selects the URL for assigning the bitrate or the SVC layer selection to the streaming proxy 203.

In operation 240, the streaming proxy 203 inspects the HTTP request transmitted from the UE 201 through the DPI, samples the URL of the video segment, and obtains the device kind information of the UE. In addition, the streaming proxy 203 determines which P-GW transmits the HTTP request of the terminal and stores the determination.

In operation 245, the streaming proxy 203 compares the URL of the sampled video segment with the stored MPD information to send the HTTP request packet for requesting the highest quality of file of the corresponding video to the media server 204.

In operation 250, the streaming proxy 203 receives the response message with respect to the HTTP request transmitted therefrom from the media server 204. In operation 260, the streaming proxy 203 transfers the response message to the UE 201. In the embodiment, the response message may be transferred to the terminal 201 through the P-GW to which the HTTP request is transmitted.

In operations 265 and 270, when the video segment is transmitted from the media server 204, the streaming proxy 203 may encode the video segment to several media files having different bitrates. Alternatively, the streaming proxy 203 may encode the video segment to the media file having several layers by using the SVC. In the embodiment, when the streaming server 203 encodes the video segment to the several media files having the different bitrates, the streaming server 203 may encode the video segment to several resolutions according to a size of a screen of the terminal 201. Alternatively, the streaming server 203 may encode the video segment by changing a frame rate according to an environment of a network and a preference of the user. In addition, when the streaming server 203 transmits a previously encoded media file according to the environment of the network and the preference of the user, the streaming server 203 may change the media file with a proper rate to transfer the media file through a frame dropping method. The streaming proxy 203 may store the encoded media file to a caching space. The streaming proxy 203 assigns a proper bitrate or SVC layer to each of the UEs 201 in a method will be described later to transmit the proper bitrate or SVC layer to the UEs 201. The embodiment is limited to a situation wherein the terminal 201 selects the URL for assigning the bitrate or the SVC layer selection to the streaming proxy 203 or a situation wherein the terminal 201 having user information received from the PCRF 205 assigns the bitrate or the SVC layer selection to the streaming proxy 203. In other embodiments, the file is transmitted with an original bitrate requested by the user through a normal Quality of Service (QoS) Class Identifier (QCI).

The video may be transferred through the P-GW to which the HTTP request is transmitted. In the embodiment, a QCI having a priority higher than a general traffic is assigned, and thus the base station 202 may previously assigns a resource to the video traffic.

In an example of the SVC, a base layer is transmitted through a GBR bearer, and only an enhancement layer may be transmitted through the present algorithm. In this embodiment, the assignment process of the bitrate or the SVC layer to the streaming proxy 203 may be determined for only the enhancement layer.

In operation 275, the streaming proxy 203 may request the number of the RB assigned to the video of each of the UEs 201 during the unit time, the downlink video transmission byte number of each of the UEs 201 during the unit time or the throughput information of each of the UEs 201 during the unit time to the control eNB 202 periodically or when necessary, to receive and store the number of the RB, the downlink video transmission byte number and the throughput information.

In operation 280, the streaming proxy 203 may request the maximum bitrate or the SVC layer of each of the UEs 201, and information related to the preferred bitrate or the SVC layer of each of the UEs 201 periodically or when necessary, to receive and store the maximum bitrate or the SVC layer, and the information related to the preferred bitrate or the SVC layer.

In operation 285, the streaming proxy 203 may determine at least one of the bitrate and the layer. The streaming proxy 203 virtually divides the RBs of the control base station (BS) 202 into two kinds of RBs including an RB used in transmitting a general traffic and an RB used in transmitting the video traffic. Importances of the two RBs may be changed according to the environment of the network by the communication provider. When the base layer is transmitted through the GBR bearer by using the SVC, and the enhancement layer is transmitted by using a non-GBR bearer, the base layer uses the separate GBR bearer, and thus it is necessary to decrease an amount of the video traffic RB for transmitting the enhancement layer.

In operation 290, the streaming proxy 203 may receive the video request from the terminal and perform the response to the request.

Figure 3:
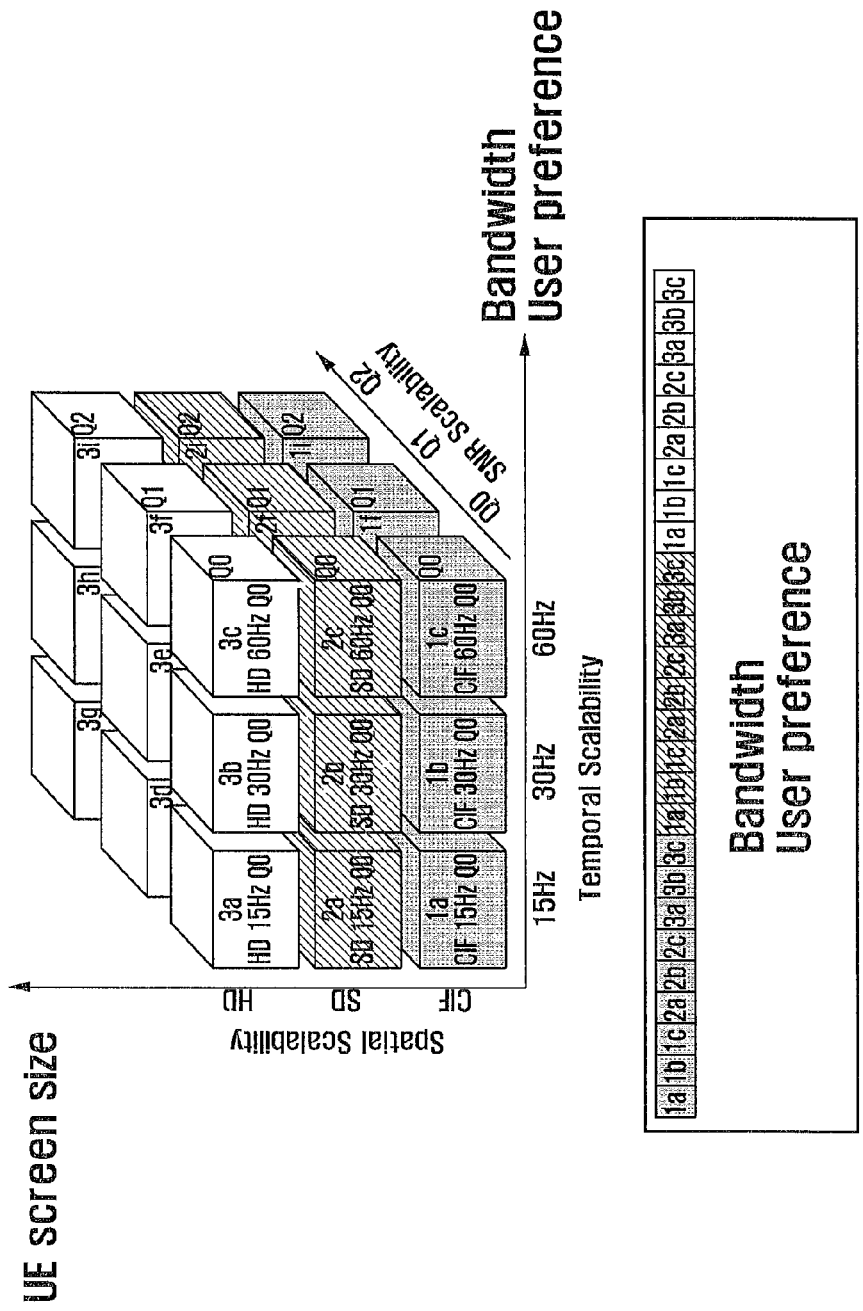
FIG. 3 illustrates a video quality according to an embodiment.

FIG. 3 illustrates a video quality according to an embodiment.

Referring to FIG. 3, in an example the SVC, temporal scalability, spatial scalability and quality scalability methods are possible. In order to apply a scalability to which resolutions of various terminals are applied, the spatial scalability is utilized. That is, it encodes in order to select different resolutions of videos according to a layer. In addition, a combination of the temporal scalability and the quality scalability may be applied in order to change the quality or the frame rate according to the environment of the network and the user's preference. The number of the bitrate or the SVC layer may be changed according to the environment of the network and a policy of the communication provider.

According to an embodiment, the base station may control the video quality in consideration of a video transmittable resource assigned to the terminal, a kind of the video and a communication performance improvement of the whole users in the cell to transmit the video.

Figure 4:
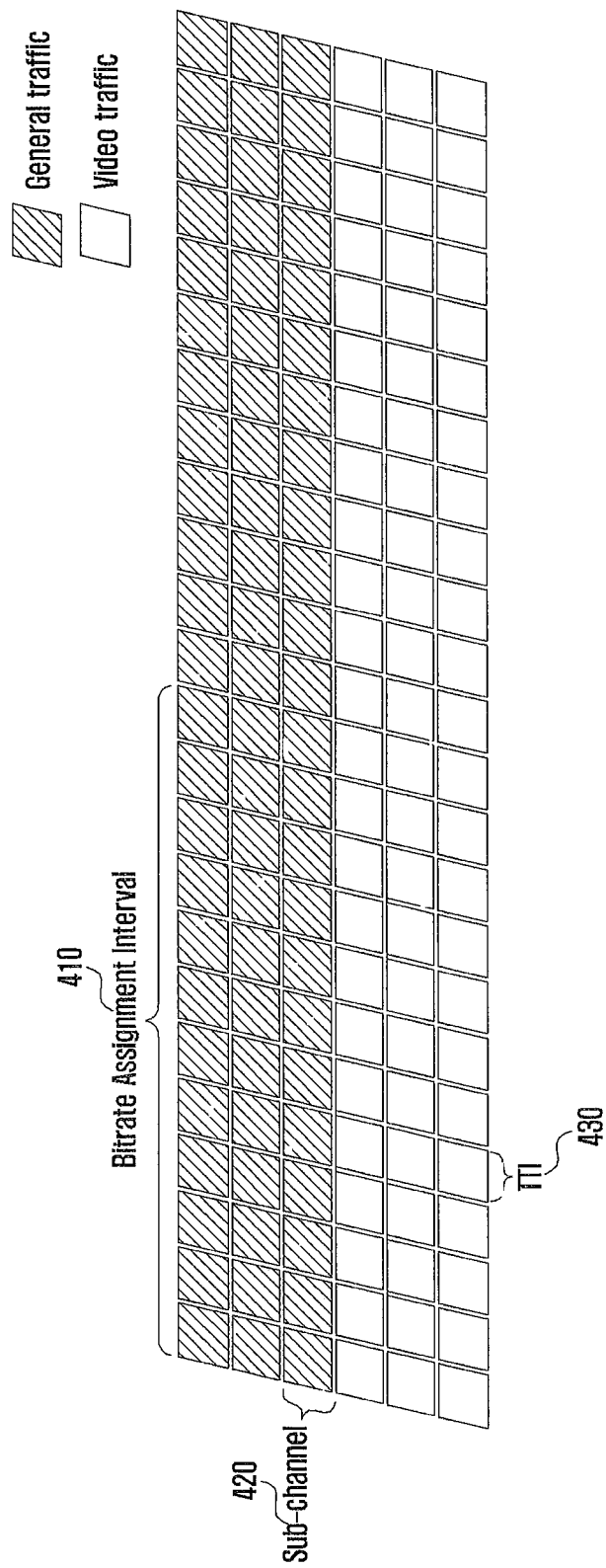
FIG. 4 illustrates the bitrate assignment according to an embodiment.

FIG. 4 illustrates the bitrate assignment according to an embodiment.

Referring to FIG. 4, the base station may assign a traffic resource for transmitting data to the terminal. The streaming proxy server may virtually divide the RBs used in transmitting the data to the terminal from the control base station into two kinds. In an embodiment, the streaming proxy server may virtually divide the RBs into the video traffic for transmitting the video and the general traffic for transmitting the data except for the video. The importances of the two RBs may be changed according to the environment of the network by the communication provider. When the base layer is transmitted through the GBR bearer by using the SVC, and the enhancement layer is transmitted by using the non-GBR bearer, the base layer uses the separate GBR bearer, and thus it is necessary to decrease the amount of the video traffic RB for transmitting the enhancement layer.

The streaming proxy assigns the video bitrate or the SVC layer of each of the UEs in a period (the communication provider may change the period according to the environment of the network. The period has several seconds.) of a Bitrate Assignment Interval (BAI) which is a multiple of a TTI. Marks used in the algorithm are the same as the following.

A. The number of the RB for the video traffic in one BAI is marked as N.

B. The whole gathering of the users (u) is marked as U.

C. The BAI is indexed to i.

D. The user (u) includes a total $L_u$ number of bitrates or SVC layers.

When the base layer is transmitted through the GBR bearer by using the SVC, and the enhancement layer is transmitted by using a non-GBR bearer, includes only the enhancement layer.

E. The bitrate or the SVC layer assigned to the user (u) from the BAI (i) is marked as $L_u^i$.

F. A unit size of the video of the user (u) is marked as $S_u$. That is, the size of the video assigned to the BAI (i) of the user (u) has a value of a product of the $L_u^i$ and a constant $S_u$.

G. The number of the RB assigned to the BAI (i) from the user (u) is marked as $n_u^i$.

H. The byte number of the video transmitted to the BAI (i) from the user (u) is marked as $b_u^i$.

The algorithm may include the following optimization operations.

Objective function $$\text{maximize } \Sigma_{u \in U} \text{utility}(L_u^i)$$

Constraints $$L_u^i \in \{1, \ldots, L_u\} \text{ for } \forall u \in U$$

$$\sum_{u \in U} \frac{s_u - L_u^i}{\frac{b_u^{i-1}}{n_u^{i-1}}} \leq N$$

When the user does not focus on the screen, the $L_u^i$ is fixed to one, and the value of the assignable $L_u^i$ is changed by utilizing the device kind information of the user, the maximum bitrate or the SVC layer received from the PCRF and the information related to the preferred bitrates or SVC layers of each of the UEs.

When the eNB transmits the throughput information of each of UEs during the unit time to the streaming proxy, a second constraint of the problem is changed to $$\sum_{u \in U} \frac{s_u - L_u^i}{t_u^{i-1}} \leq N$$

(when the throughput during the BAI (i−1) of the user (u) is $t_u^{i-1}$).

This problem has a bounded knapsack problem form, and may be solved through various approximation algorithms. In addition, the BAI which is an assignment period of the bitrate or the SVC layer has about several seconds, and thus a plurality of the base stations may be managed according to an embodiment.

Figure 5:
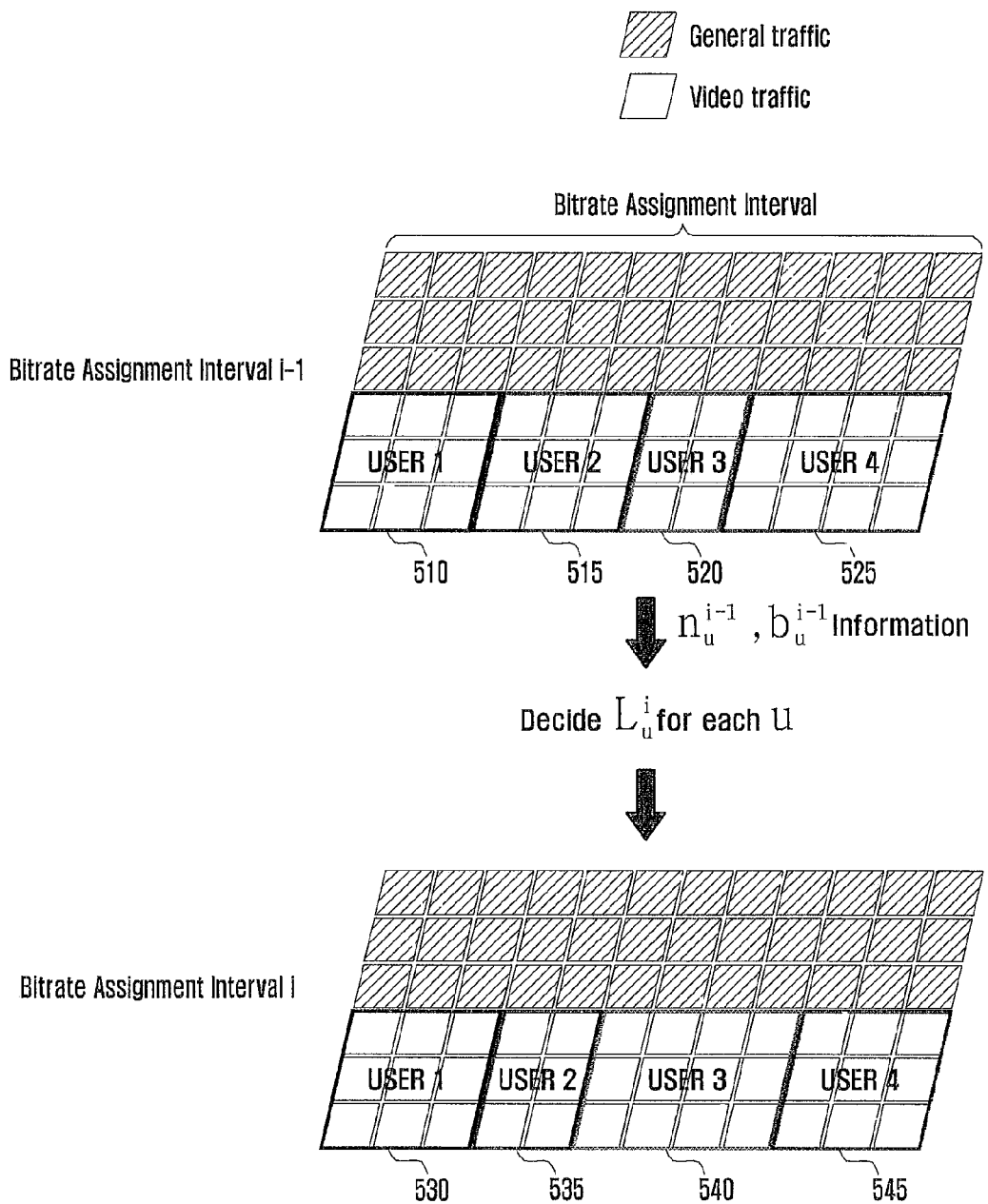
FIG. 5 illustrates a change of the bitrate assignment according to an embodiment.

FIG. 5 illustrates a change of the bitrate assignment according to an embodiment.

Referring to FIG. 5, in a bitrate assignment interval (i−1) of the embodiment the video traffic may be distributed to the user, and the streaming proxy or the base station may control an amount of the traffic resource used for each of the users in a next bitrate assignment interval (i) through the algorithm described with reference to FIG. 4.

Figure 6:
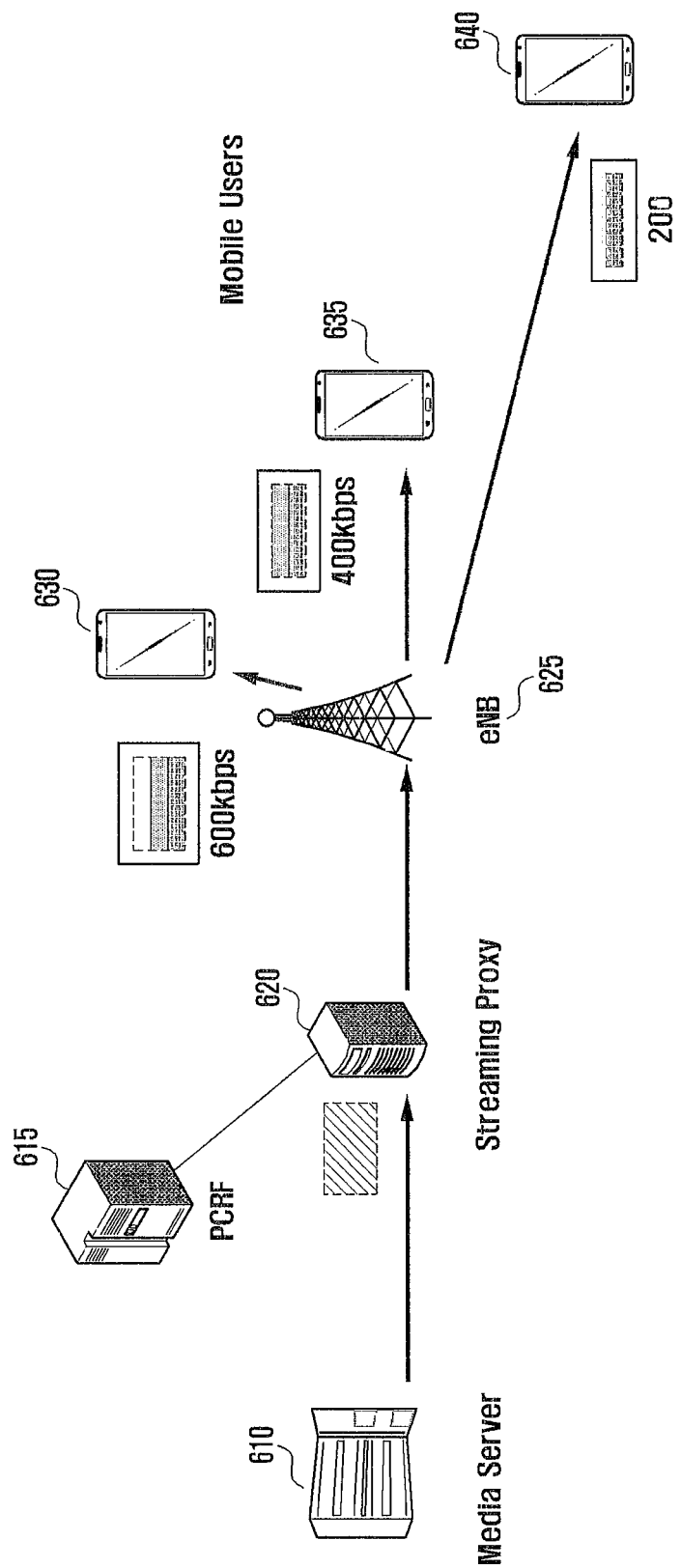
FIG. 6 illustrates a system according to an embodiment.

FIG. 6 illustrates a system according to an embodiment.

Referring to FIG. 6, the system of the embodiment may include a media server 610 capable of storing, transmitting and receiving the data including the video, a PCRF 615 storing the data including the user information, a streaming proxy server 620 performing an operation for transmitting and receiving the video data according to an embodiment, a base station 625 transmitting or receiving a signal to or from another communication entity and at least one terminal 630, 635 and 640 capable of transmitting or receiving the signal to or from the base station 625.

In the embodiment, the streaming proxy server 620 may receive the video data from the media server 610 according to the request of the terminal. The streaming proxy server 620 may provide different qualities of videos to the user based on a kind of the video, the subscriber information, the traffic resource information assigned to the terminals 630, 635 and 640 from the base station 625 and a kind of the terminals 630, 635 and 640. As described above, the whole video quality provided to the terminal in the cell may be improved according to the operation of the streaming proxy server 620.

FIG. 7 illustrates a video quality in accordance with the bitrate assignment according to an embodiment.

FIG. 7 shows a relation between the bitrate and the PSNR and a relation between the bitrate and a packet loss according to each of experiment methods. In the embodiment, the streaming proxy server may control the bitrate assignment according to the kinds of each of the videos in order to increase a utility of a reception of the video received by the whole user in the cell.

FIG. 8 illustrates a signal flow for describing the bitrate assignment according to an embodiment.

Referring to FIG. 8, a system may transmit or receive data between at least two of a first terminal (User Equipment 1 (UE1)) 801, a first base station (Base Station 1 (BS1)) 802, a bitrate selection server (Bit-Rate Selection (BRS)) 803, a Policy Charging and Rules Function (PCRF) 804 and a Media Server (MS) 805.

In the embodiment, the BS1 802 may include the eNB in a Long Term Evolution (LTE) base station. In addition, in the embodiment, the BS1 may store Modulation Coding Scheme (MCS) information used for transferring a downlink traffic to the UEs, the number of RB assigned to the video of each of the UEs during the unit time and the downlink video transmission byte number of each of the UEs during the unit time.

In the embodiment, the BRS 803 may be a server performing a separate function, and may be located with the BS1 802. In addition, the BRS 803 of the embodiment may include the following functions.

i. A function of inspecting an HTTP request of the terminal 801 through the DPI and sampling a URL of metadata (e.g., MPD)

ii. A function of requesting the metadata to the media server 805 through the sampled URL of the metadata MPD), parsing the result of the request and storing the metadata information iii. A function of inspecting the HTTP request of the terminal 801 through the DPI and sampling the URL related to the video iv. A function of dividing a TCP between the terminal 801 and the BRS 803 into two TCPs including a TCP between the terminal 801 and the BRS 803, and a TCP between the BRS 803 and the media server 805 v. A function of requesting the following information to the BS 802 and receiving the following information from the BS 802

A. Radio network information of each of UEs (the following values are possible.)

a. The MCS information used for transferring the downlink traffic to the UE b. The RB assigned to the video of each of UEs during the unit time c. The downlink video transmission byte of each of UEs during the unit time B. The RB assigned for transferring the downlink video to all UEs by each of the BSs 802 during the unit time vi. A function of selecting the bitrate transferred to each of terminals, by using the above metadata information of ii., the whole information of the BS 802 transferred from the BS 802 of v. and the information of each of terminals (the following selection method is possible according to each of video transferring methods)

A. In an example of an HAS: select a segment representation

B. In an example of the SVC: a function of selecting a layer

C. In an example of a transcoding: transcoding target bitrate

D. The streaming proxy assigns the bitrate or the SVC layer by using the following information In the embodiment, the media server 805 may store video data requested by the UE1 801. In addition, in the embodiment, the media server 805 may further store the following user's satisfaction information to a video metadata file. In other words, the quality sensitivity field is added to the segment information so that the CP displays the user's satisfaction of the corresponding segment. In an embodiment, at least one of the high value of the image quality sensitivity in the example of the action scene of the movie to which the high quality of image is desirable, the low value of the image quality sensitivity in the example of the simple dialogue scene, a QoE metric (PSNR, MOS) experienced by the user when the user watches each of the segments, a function capable of calculating the MOS or the PSNR experienced by the user according to each of the bitrates (or a layer number when SVC) and variable information used in the function may be stored.

In operation 810 of the embodiment, the terminal (UE1) requests the metadata of the video to be received from the MS 810, and the BRS 803 may receive the request.

In operation 815, the BRS 803 may expect that the MS 805 transfers the metadata information by intercepting the request, and may transfer the request to the MS 805.

In operation 820, the MS 805 may transfer the video metadata response according to the request to the BRS 803. The metadata response may include user's QoE information of each of bitrates of the video segment. In addition, the response may include the PSNR value or the MOS value of each of the bitrates or each of the representations of the video segment. In addition, the response may include a function needed in the PSNR or the MOS calculation of each of the bitrates or each of the representations of each of the segments.

In operation 825, the BRS 803 may sample the video metadata based on the information received in operation 820, to sample the video information requested from the UE1 801. In addition, the BRS 803 may store the sampled video information.

In operation 830, the BRS 803 may transfer the video metadata response to the UE1 801.

In operation 835, the BRS 803 may expect that the UE1 801 requests the video data to the PCRF 804, and may request the subscriber information corresponding to the UE1 801 to the PCRF 804.

In operation 840, the PCRF 804 may transfer the user's information, and the user's information may include a user's importance. The importance may include a premium user information of the subscriber information or priority information of a packet with respect to the user.

In operation 845, the UE1 845 may transmit a request for requesting the video segment to the media server to the BS1 802.

In operation 850, the BS1 802 may transmit the request to the BRS 803 by including an identifier of the BS1 802. The identifier may include a TEID of the BS1 802 and an internet protocol (IP) of the BS1 802. The identifier may be transferred after being written into an extension of a GTP-U header.

In operation 855, the BRS 803 may request information of the BS1 802 and the UE1 801. The information of the UE1 801 may include a Radio Resource Network (RAN) information of the terminal (UE1) 801.

In operation 860, the BS1 802 may transfer information of the BS1 802 and the RAN information of the UE in the cell of the BS1 802 in correspondence to the request of the operation 855. In the embodiment, the information of the BS1 802 may include the number of the RB assigned to the video traffic of the whole terminals in the cell by the BS. The information of the UE may include the number of the RB for transferring one byte to each of the UEs. The information of the UE may be a quotient obtained by dividing a number of the byte transmitted to the UE during a just previous time period by the number of the RB used at that time.

In operation 865, the BRS 803 may select the bitrate of the video segment requested by the UE1 801 based on at least one of the information received at previous operations. In an embodiment, the BRS 803 may select the bitrate based on at least one of the video metadata received in operation 825, the subscriber information received in operation 840, the information of the BS1 received in operation 860 and the RAN information of the UE1 received in operation 860.

In operation 870, the BRS 803 may request the video segment to the MS 805 with the bitrate selected in operation 865.

In operation 875, the MS 805 may transmit the video segment in response to the request received in operation 870.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for supporting video transmission and reception in a bitrate selection server of a mobile communication system, the method comprising:
   receiving a metadata request of a video from a terminal;
   transmitting the received metadata request to a media server based on the metadata request;
   receiving a video metadata response from the media server;
   storing the received video metadata and transmitting the received video metadata to the terminal;
   requesting subscriber information of the terminal to a Policy and Charging Rules Function (PCRF) and receiving the subscriber information;
   receiving a video segment request of the video from the terminal;
   sending a request for information of a base station and the terminal corresponding to the video segment request of the video to the base station;
   receiving the information of the terminal and the base station from the base station; and
   determining a bitrate of the video based on the video metadata, the subscriber information, and the information of the terminal and the base station,
   wherein the receiving of the information of the terminal and the base station comprises receiving at least one of, a number of a Radio Resource Blocks (RBs) assigned to a video traffic of the whole terminals in a cell by the base station and a number of RBs necessary to transfer data to each of the terminals, from the base station.

2. The method of claim 1, wherein the receiving of the video segment request comprises receiving information including an identifier of a base station transmitting or receiving a signal to or from the terminal.

3. The method of claim 1, wherein the receiving of the response of the metadata comprises receiving information including a user Quality of Experience (QoE) information according to each of the bitrates of the video, and a Peak Signal-to-Noise Ratio (PSNR) value or a Mean Opinion Score (MOS) value according to each of the bitrates or each of the responses of the video.

4. A bitrate selection server for supporting transmission and reception of a video in a mobile communication system, the bitrate selection server comprising:
   a transmission and reception unit configured to transmit and receive a signal to or from another communication entity; and a control unit configured to control the transmission and reception unit, receive a metadata request of a video from a terminal, transmit the received metadata request to a media server based on the request, receives a metadata response from the media server, store the received video metadata, transmits the metadata to the terminal, request a subscriber information of the terminal to a Policy and Charging Rules Function (PCRF), receive the subscriber information, receive video segment request of the video from the terminal, send a request for information of a base station and the terminal corresponding to the video segment request of the video to the base station, receive the information of the terminal and the base station from the base station, and determine the bitrate based on the video metadata, the subscriber information, and the information of the terminal and the base station, wherein the control unit receives at least one of, a number of a Radio Resource Block (RB) assigned to a video traffic of the whole terminals in a cell by the base station and a number of the RB necessary to transfer data to each of the terminals, from the base station.

5. The bitrate selection server of claim 4, wherein the control unit is configured to receive information including an identifier of a base station transmitting or receiving a signal to or from the terminal.

6. The bitrate selection server of claim 4, wherein the control unit is configured to receive information including a user Quality of Experience (QoE) information according to each of the bitrates of the video, and a Peak Signal-to-Noise Ratio (PSNR) value or a Mean Opinion Score (MOS) value according to each of the bitrates or each of the responses of the video, from the media server.

\* \* \* \* \*